United States Patent [19]

Ban et al.

[11] 4,129,889

[45] Dec. 12, 1978

[54] MAGNETIC RECORDING/REPRODUCING APPARATUS USING CASSETTE

[76] Inventors: Itsuki Ban, 829, Higashioizumimachi, Nerimaku, Tokyo; Kazunori Mochizuki, 6673 Oazahodaka, Hodakacho, Minamiazumi-gun, Nagano-gun, both of Japan

[21] Appl. No.: 799,278

[22] Filed: May 23, 1977

[30] Foreign Application Priority Data

| May 29, 1976 | [JP] | Japan | 51-61794 |
| Sep. 10, 1976 | [JP] | Japan | 51-107906 |
| Nov. 1, 1976 | [JP] | Japan | 51-130471 |

[51] Int. Cl.² .............. G11B 21/02; G11B 15/46; G11B 21/22
[52] U.S. Cl. .............................. 360/75; 360/73; 360/105
[58] Field of Search .................. 360/73, 75, 96, 105

[56] References Cited

U.S. PATENT DOCUMENTS

| 3,503,485 | 4/1970 | Andrews | 360/73 |
| 3,624,308 | 11/1971 | Kozu et al. | 360/73 |

*Primary Examiner*—Robert S. Tupper
*Attorney, Agent, or Firm*—Lane, Aitken, Dunner & Ziems

[57] ABSTRACT

In a magnetic recording/reproducing apparatus having a support which reciprocates between reproduce and stop positions and is biased by a spring in the direction of the reproduce position, a magnetic head which is mounted such that it contacts with a magnetic tape at the reproduce position and disengages from the magnetic tape at the stop position. The head is mounted on the support and a pinch roller is mounted where it can be depressed against a capstan at the reproduce position. The pinch roller is removed from the capstan at the stop position on the support or on a deck. The pinch roller is also biased by a spring in the direction of the capstan. The reproducing apparatus has a magnetic body actuator which mechanically actuates a mechanism which slightly moves the support from the reproduce position to the stop position side to a desired degree so that the magnetic head keeps a slight contact with the magnetic tape and disengages the pinch roller from the capstan. An electromagnetic apparatus latches and holds the magnetic body actuator by magnetic force. A mechanism extinguishes the electromagnetic force by electric signals from a non-signal zone detecting circuit which detects the non-signal zones of the magnetic tape.

10 Claims, 25 Drawing Figures

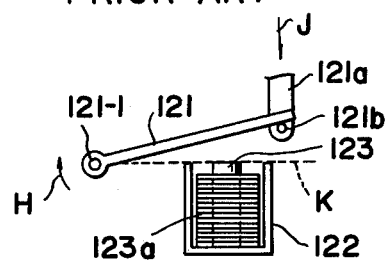
FIG. 1 "PRIOR ART"
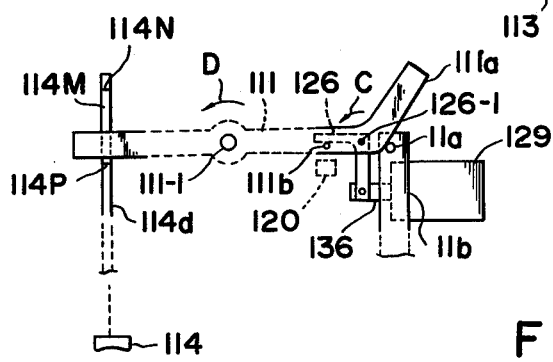
FIG. 2
FIG. 3
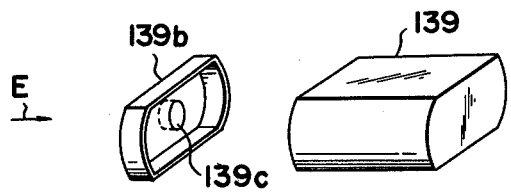
FIG. 4a
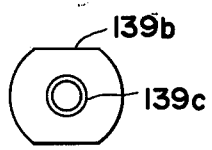
FIG. 4b
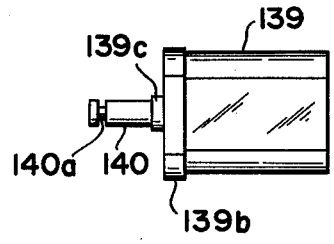
FIG. 4c
FIG. 4d
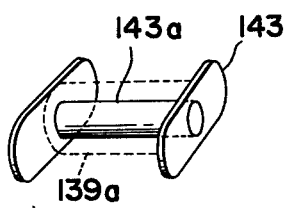

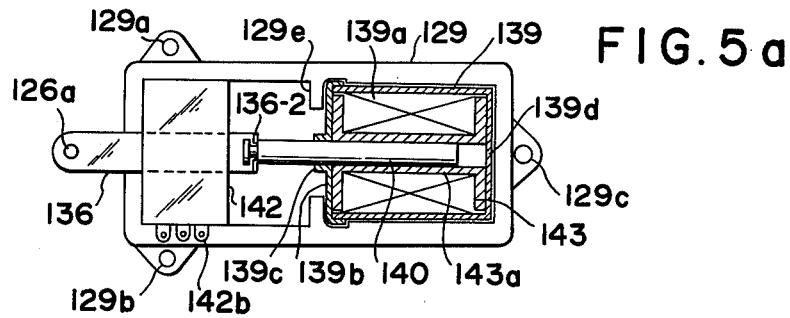
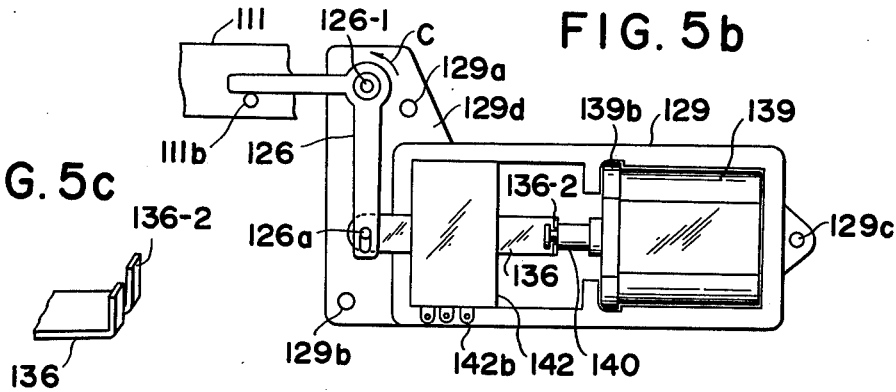
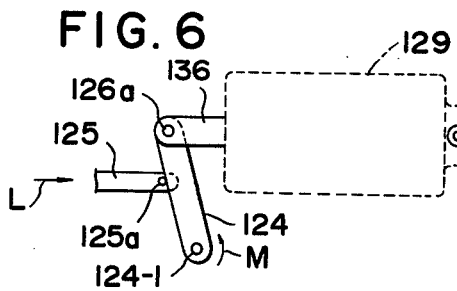
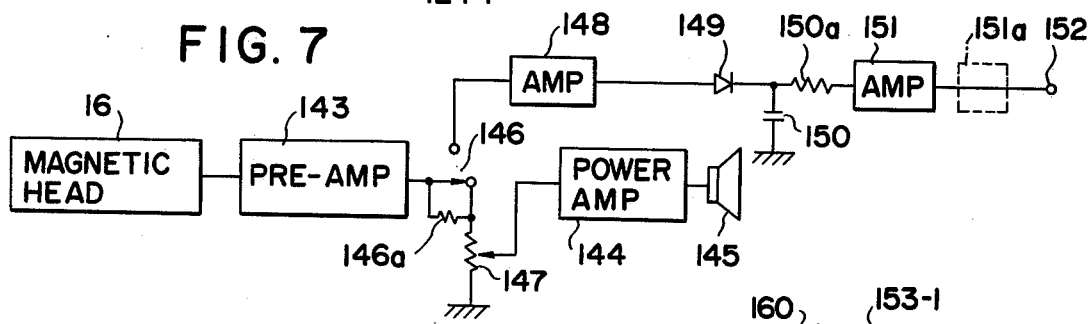
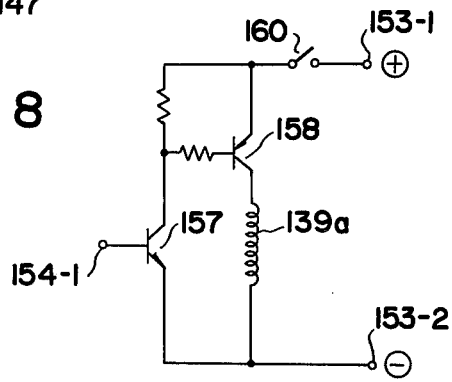

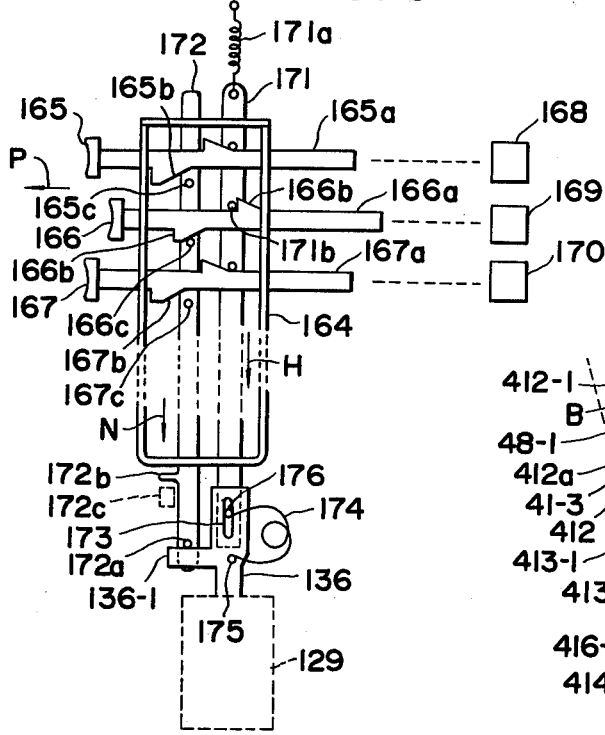
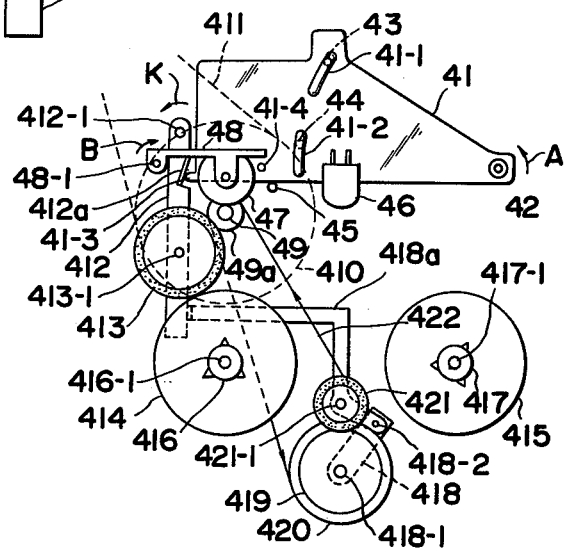
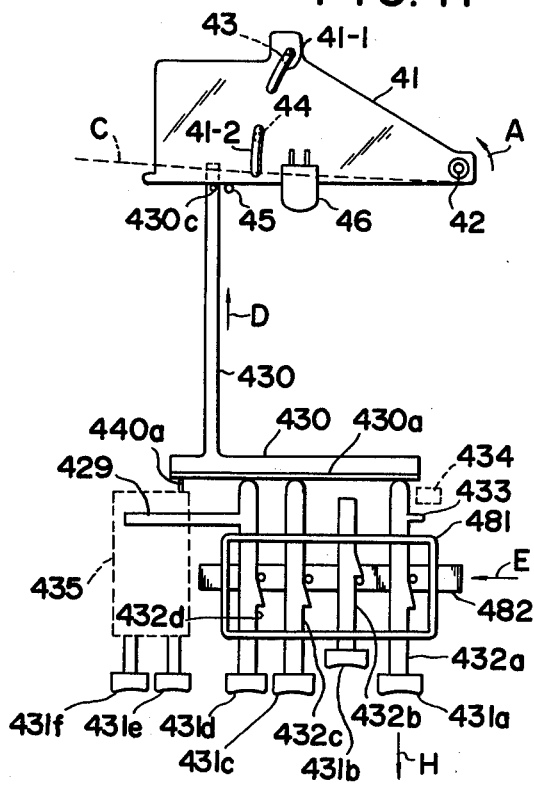
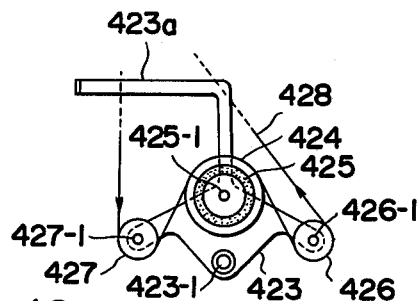
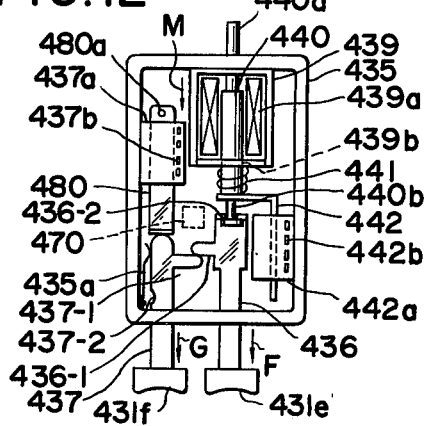

MAGNETIC RECORDING/REPRODUCING APPARATUS USING CASSETTE

BACKGROUND OF THE INVENTION

This invention relates to a magnetic recording/reproducing apparatus which uses a cassette and is able to select a desired tune or message by passing over one or several tunes or messages during rewind or fast-feed.

A mechanism which selects a desired tune by fast-feeding or rewinding the magnetic tape is known. In this prior art mechanism, however, a movable plate carrying a magnetic head is attracted and is held against the strong force of spring while the desired tune is being played, so that an electromagnetic locking device with high consumption of electric power is required.

An example of an apparatus of this kind will now be described in conjunction with FIG. 1 of the appended drawings.

As shown, a magnetic coil 123a is wound around a cylindrical, soft steel, magnetic core 123 which is planted on a square-shaped york 122 fixed to a frame (not shown). There is a closed magnetic circuit through the york 122 and the magnetic core 123. A soft steel member 121 rotatably supported on the frame by a shaft 121-1 is strongly attracted and locked when the member 121 moves to the position shown by dotted line K. For example, the soft steel member 121 is biased in the direction of arrow H by a spring (not shown) and in the direction of the bias an abutting pin 121b fixed to a lever 121a engages a free end of the member 121. When the lever 121a is manually pushed in the direction of arrow J, the member 121 is rotated clockwise to the position of the dotted line K where it is attracted and held by the magnetic core 123. In this way the lever is locked in place and prevented from returning to the position shown in FIG. 1. The end portions of the york 122 and the magnetic core 123 are in contact with a surface of the soft steel member 121 with substantially no clearance therebetween so that the magnetic circuit is closed and the member 121 is held.

In this prior art apparatus, however, there is a drawback of the efficiency being low when the magnetic circuit is closed because of the leakage of magnetic flux at several portions. Another drawback in the prior art is that the contact-force is extremely decreased and causes disadvantages if there is dust on the contact surfaces. Another disadvantage of the apparatus in the prior art is that it is expensive and not available for mass-production because of the need for high relative-accuracy of each portion during assembly. Furthermore, since the lever 121a is to move in the direction of arrow J there are additional disadvantages depending on the usage. It is desirable that no forces act on the soft steel member 121 before it comes in contact with the magnetic core 123 and that a strong locking force occurs only when contact is made, a feature not found in the prior art.

SUMMARY OF THE INVENTION

The subject invention provides an electromagnetic locking apparatus which has a strong locking force, but with a low consumption of electric power and high efficiency. Further, the inventive apparatus applies the above features to an attracting and holding mechanism of a movable plate of a magnetic recording/reproducing apparatus for successfully eliminating the above-described drawbacks in the prior art.

Accordingly, the first object of the invention is to provide a magnetic recording/reproducing apparatus which uses a powerful electromagnetic apparatus for attracting and holding a movable plate while a desired tune or message is being selected during fast-feed or rewind.

A second object of the invention is to provide a magnetic recording and reproducing apparatus which uses a electromagnetic apparatus wherein a large amount of electric power is not required for attracting and holding the movable plate while a desired tune or message is being selected during fast-feed or rewind.

A third object of the invention is to provide a magnetic recording/reproducing apparatus which uses an electromagnetic holding apparatus with increased holding force without increasing the size or weight of the casing.

These and other objects of the invention will be apparent from the following description.

BRIEF DESCRIPTION OF THE DRAWINGS

FIG. 1 is an illustrative schematic view of an electromagnetic locking apparatus in the prior art;

FIG. 2 is an illustrative schematic view of an embodiment of the inventive apparatus in the reproducing state;

FIGS. 3-6 are illustrative views of electromagnetic apparatuses used for the present invention;

FIGS. 7 and 8 are circuit diagrams of a selecting apparatus;

FIG. 9 is a schematic view of a main body of one embodiment of the invention;

FIGS 10a and 10b are schematic views of a second embodiment of the invention;

FIG. 12 is a schematic view of an electromagnetic locking apparatus for the embodiment of FIGS. 10a and 10b;

DESCRIPTION OF THE PREFERRED EMBODIMENT

Figure 13:
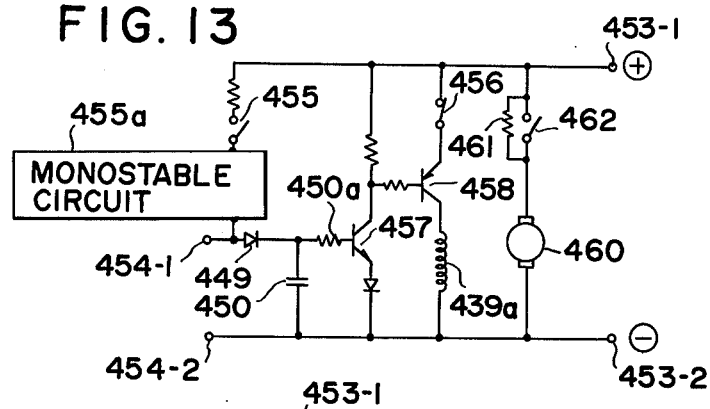
FIG. 13 is a circuit diagram of an electric circuit of an exiting coil energized by a time constant circuit.

Referring now to FIG. 2 a magnetic recording/reproducing apparatus is shown which uses a cassette. This apparatus utilizes the so-called Italian mechanism which has a simple structure and can be produced to be small in size, light in weight and low in cost so that it is effective for vehicle use. This apparatus has only three modes of operation: (1) reproduce and play, (2) stop (including ejection at the same time) and (3) fast feed. Therefore the selection of a tune or message can only be performed by a cue mode.

Reference numeral 117 refers to a case or outer casing into which a cassette 13 has been inserted from the direction of arrow G. The case 117 is rotatably supported by shafts 118a and 118b which are studded on the case 117. Bearings 119a and 119b are attached to a main body (not shown) and supported by the surface of a panel of the main body. A wind reel 110 and a reel stand 19 formed together are provided on a deck (not shown) attached to the main body. When the cassette 13 is depressed against the surface of the deck, the reel 110 engages a hub of the cassette and winds a magnetic tape in the cassette.

The reel stand 19 is driven by a known slip mechanism through the driving force of a capstan 14. The capstan 14 is supported by a bearing 14a provided on the deck. A fly wheel 15 is fixed to a lower end of the capstan 14. The fly wheel 15 is driven counterclockwise by a motor and drive belt (not shown). A support 11 is rotatably supported around a support shaft 12 which is provided on an extension 117a of the case 117 and biased in the direction of arrow A by a spring (not shown).

A magnetic head 16 is mounted on the support 11. A lever 18 is pivotally mounted on a support shaft 18-1 which is studded on the support 11 and biased in the direction of arrow B by a spring (not shown). A pinch roller 17 is mounted on a free end of the lever 18 for pinching the magnetic tape and pressing it to the capstan 14. The capstan 14 rotates counterclockwise and the magnetic tape contacts the magnetic head 16 for reproduction on the tape, at which time the magnetic tape is wound around the hub by the reel 110. At this time the reel 110 is rotating and slipping to the revolution of the capstan 14 through a well known slip mechanism. When the support 11 is turned clockwise and the magnetic head 16 and the pinch roller 17 are disengaged from the magnetic tape and the capstan 14 respectively, the above described slip is extinguished and accordingly the magnetic tape is wound at a high speed, resulting in a fast feed of the tape.

When the magnetic head 16 is in slight contact with the magnetic tape and the pinch roller 17 is held remote from the capstan 14, the apparatus is in the cue mode. At this time, if a governor of the motor is rendered inoperative the running speed of the magnetic tape in the fast feed or in the cue mode can be increased. In this embodiment, the support 11 pivots around the support shaft 12, but if the support 11 is made to slide relative to the case 117 in a back and forth motion parallel with the front edge of the cassette 13, the same object will be achieved.

The support 11 may be constructed to pivot around a support shaft provided on the deck. When the support 11 is pivoted clockwise an abutting pin 18a planted on the support 11 abuts a lever 18 and disengages the pinch roller 17 from the capstan 14. It is necessary that in the cue mode, as described above, the magnetic head 16 slightly contacts the magnetic tape and moreover the pinch roller 17 does not touch the capstan 14.

The mounting and the ejection means will now be described. The state shown in FIG. 1 illustrates the apparatus in its reproducing state. When a push button 113 is depressed, the case 117, by means of a connecting mechanism designated by a dotted line E and reference numeral 116 and of an ejection mechanism, is pivoted upward around the support shafts 118a and 118b, i.e. in the direction of lifting from the deck against the bias force of a spring (not shown). The spring can be hooked to the case 117 close to the deck surface. The case 117 is pivoted against the bias force of the spring by the depression of the push button 113.

The mechanism 116 is a well known ejection mechanism and performs the following action. By depressing the push button 113, the case 117 is pivoted and lifted from the deck surface at the same time a part of the support 11 is depressed, pivoting the same clockwise, and the magnetic head 16 and pinch roller 17 are released from the cassette 13.

Upon finishing the lift, the back edge of the cassette 13 is pushed by an ejection lever, thereby moving and ejecting the cassette 13 in the direction opposite that of arrow G. As the case 117 is being ejected it is lifted and inclined relative to the deck surface. For starting the reproduce mode, the cassette 13 is manually depressed in the direction of the arrow G and inserted into the case 117 until the back edge of the cassette pushes and moves the ejection lever back to its initial position.

When the cassette 13 is fully inserted in the case 117, the holding action of the above described holding lever is released, causing the case to pivot and come close to the deck surface together with the cassette 13. At the same time the support 11 rotates counterclockwise, causing the magnetic head 16 and pinch roller 17 to contact the cassette 13 to state the reproduce mode. A door switch (power switch) is provided and located so that only when the case 117 is on the deck surface is an actuator of the door switch press-contacted with the case 117 so that electric power is supplied.

Several tunes or messages are recorded in a track of a magnetic tape. For selecting one of them efficiently and quickly, an electromagnetic locking apparatus later described can be utilized. Afterwards the tune or message selection mechanism will be described.

Reference numeral 114 indicates a selection button and numeral 114a a push button rod connected to the button 114. The push button rod 114a is lightly biased by a spring (not shown) in the direction of arrow F. A lever 111 is rotatably supported by a support shaft 111-1 provided on the deck and biased in the direction of arrow D by a spring (not shown). An abutting pin 112 studded on the deck is provided to limit rotation of the lever 111. An end portion 114d of the push button rod 114a is positioned to abut the left end portion of the lever 111. An abutting pin 11a studded on the back of an extension 11b of the support 11 abuts an inclined surface of 111a located on the right end portion of the lever 111. Therefore, when the push button 114 is depressed, the lever 111 rotates clockwise about the shaft 111-1. The support 11 also pivots clockwise, causing the magnetic head 16 and the pinch roller 17 to disengage from the cassette 13 to stop reproducing.

It is possible that when the support 11 is pivoted a predetermined distance the fast feed mode is actuated and when the same is held at a predetermined angle the cue mode is actuated. Numerals 129 and 136 indicate an electromagnetic apparatus which, in the state of the cue mode and by means of an actuator 136, operates to lock the lever 111 and the support 11. The actuator 136 is so connected to the left end portion of the lever 11 that the same can rotate by means of a hole 126a and a connecting pin inserted thereinto. Therefore by supplying the electric power to an exiting coil 139a (FIG. 4d) of the magnetic apparatus and depressing the push button 114 at the same time, the actuator 136 is pushed and the actuator 140 (FIG. 4c) also moves. This action causes the magnetic circuit of the magnetic coil to close and the actuator 140 is firmly attracted, therefore both the lever 111 and the support 11 are locked and held in the cue mode. For the same object as above described it may be possible to provide the magnetic apparatus on the position indicated by numeral 129 and to connect the actuator 136 to a portion 11c of the support 11.

The actuator 136 of the magnetic apparatus can be connected to the lever 111 as shown in FIG. 3 or it can be slightly modified and results in that shown in FIG. 5b. That is, a lever 126 is supported by a support shaft 126-1 studded on an extension 129d of the case 129 and is biased in the direction of arrow C by a spring (not shown). An end portion of the lever 126 is rotatably connected to the leftmost portion of the actuator 136 by a connecting pin and the leftmost portion abuts an abutting pin 111b studded on the lever 111. In FIG. 3, when the lever 111 rotates clockwise being pushed by a step portion 114p of a push button 114a by the depression of a push button 114 (in FIG. 2), the lever 126 rotates counterclockwise and the actuator moves rightward and is locked. Therefore, since the lever 111 is also locked by means of an abutting pin 111b, the support 11 is also locked by means of an abutting pin 11a and is held in the cue mode thereby. In the present magnetic locking mechanism pushing and depressing the push button 114, the lever 114 also further rotates, the abutting pin of the lever 111 removes from the lever 126 and at the same time the support 11 also further rotates clockwise. Therefore, it is possible that the magnetic head and the pinch roller 7 are largely detached from the magnetic tape and the capstan 4 respectively and the cue mode is caused. Namely, upon usage of the lever 126 the cue or the fast feed can be selected according to the degree of the depression of the push button 114. At the time of the fast feed and the cue mode, a changeover switch 120 can be changed and this action is to render a governor of a motor driving the capstan 14 and to result in the high speed revolution of the motor which increases the tape speed in the fast feed and the cue. As understood through the above description, when no electric power is supplied to the exiting coil 139a (FIG. 4d) of the electromagnetic apparatus and the push button is pushed in two steps, respectively, the cue and the fast feed can be selected. By detaching the hand from the push button, the apparatus will return to the reproduce mode. When, in the state of supplying the electric power to the exiting coil 139a by depressing the push button 114, the cue mode is held. Further depression of a push button 113 causes the fast feed, and returning the same results in the cue mode. Since the exiting electric current is of approximately 12 volts and 50 miliampere, the locking can be performed by small electric power. Therefore the special increment of the capacity of a source transformer is not required, accordingly the apparatus is effective. Since by changing the proportion of the lengths of arms of both ends of the support shaft 126-1 of the lever 126, the above described exiting electric power is decreased further and the apparatus is effective. The details of the means of usage of the magnetic apparatus in the present embodiment is shown in FIG. 5b. The lever is provided on the support 129 for enabling the precise holding of the relative position of each member.

Now the details of the electromagnetic apparatus used for the above described embodiment will be described in conjunction with FIGS. 4, 4a, 4b, 4c and 5. In FIG. 4a, numeral 139 indicates a case made of soft steel plate which is formed in a pot shaped core by press manufacturing. A lid body 139b of a soft steel plate which is also press manufactured as well is fixedly inserted into the left end portion of the case body 139. A hole having a flange portion 139c is provided at the center of the case body 139b by press manufacturing. The flange portion 139c operates to decrease the magnetic resistance between the cylindrical actuator 140 and to increase the friction force between them, although this is not always necessary. A front view of the lid body 139b is shown in FIG. 4 and it can be seen that the section of the lid body 139b may be circular, but as shown it can be formed of a circle cut off at its upper and lower portion, the flat hole making it easy to use.

FIG. 4d illustrates an exiting coil 139a and a coil frame 143. The coil frame 143 is formed of plastic. The frames are sized so that when the frames on both ends are inserted into the case body 139, they closely contact with the inner wall of the case body 139 and are unable to move relative to the latter. The exiting coil 139a is mounted around a winding core 143a. A soft steel cylindrical actuator 140 (shown in FIG. 4c) is slidably inserted into the circular hole having the flange portion 139c and the long hole in the inner part of the winding core 143a. As shown in FIG. 5a, the case body 139 and the lid body 139b are buried in the plastic support 129 (electromagnetic locking apparatus) and are fixed by paste.

Now the action of the electromagnetic apparatus will be described in conjunction with FIG. 5. The support 129 is riveted to the main body by holes 129a, 129b and 129c. A part indicated by numeral 129e is a protrusion to prevent the main body from moving leftward. The part indicated by numeral 142 is an electric switch which, in the present embodiment, forms a slide switch in which a desired number of slidable contacts are mounted on the inner part thereof. The rightward and leftward movements of the actuator 140 actuate the slide switch 142. Numeral 142b indicates a lead out terminal. The right end of the actuator 136 is bent as shown in FIG. 5c and is connected to the hollow 140a provided on the left end of the actuator 140 shown in FIG. 4. This configuration allows the actuators 140 and 136 to be automatically connected when the case body 139 is inserted from above since the electric switch 142 is formed in one body together with the support 129.

Now the action of the above described electromagnetic apparatus will be described. Since the rightward movement of the actuator 136 through an engaging portion 126a causes the actuator 140 to move together therewith, the right end of the actuator 140 contacts closely with the portion 139d of the bottom of the case 139. Accordingly such an effect is produced that the magnetic circuit is sufficiently closed and the actuator 140 is attracted and engaged to provide an electromagnetic locking.

At this time the flange portion 139c decreases the magnetic resistance. Since the hole is closed, the closely contacted surfaces are always kept clean. The actuator 140 is different from ordinary electromagnetic plunger since it is constructed to be attracted to and closely contacted with a part of the side of the flange portion 139c so that the force for attracting the actuator rightward and the above described friction force are nearly equal. In this way the locking effect is produced only when the right end of the actuator 140 closely contacts with the portion 139d, which is characteristic of the present embodiment. There are other characteristics of the invention which are described below.

When the actuators 136 and 140 move leftward the friction force between the flange portion 139c and the actuator 140 reverses in direction, which operates to double the locking force. The contacting surfaces of the flange portion 139c and the actuator 140 are roughened which effectively increases the locking force. The case body 139 and the electric switch 142 are convenient to use since they are accommodated in the same support 129.

FIG. 6 shows an embodiment where the means for supporting the support body 129 by the main body is modified. A support 129 is pivotally supported on the main body by a screw 129f. A lever 124 is pivotally supported on the main body by a screw 124-1 and is biased in the direction of arrow M by a spring (not shown). The free end of the lever 124 is connected to the actuator 136 through an engaging portion 126. When the lever 125 is manually depressed in the direction of arrow L, the lever 124 rotates clockwise. The actuator 136 moves rightward and is engaged for locking the lever 124 at this position. The lever 126 may be directly connected to the actuator 140.

Now the tune or message selecting means will be described in conjunction with FIG. 7 and FIG. 8. In FIG. 7, numeral 16 indicates a magnetic head, the reproducing output of which is amplified by a pre-amplifier 143 and is supplied to a main amplifier 144 through a volume controller 147. It is so constructed that this output is obtained as an audio output. This construction is a main part of the electric circuit, and in the case of stereo two pairs of the same circuits are used.

When a changeover switch is changed the output from the pre-amplifier 143 is (1) amplified by the amplifying circuit 148, (2) rectified by a diode 149, (3) smoothed by a condenser 150, and (4) amplified by an amplifying circuit 151 through a resistor 150a, and the direct current output is obtained. This output is supplied to the exiting coil 139a shown in FIG. 5.

In the case of stereo, the outputs of both the channels are obtained from the terminal 152. The diode 149, the condenser 150 and the resistor 150a construct a time constant circuit (delaying circuit). When the input is supplied continuously, the output from the terminal 152 is an approximately even direct current output. Only after the predetermined time is over and the output is cut off, does the output from the terminal 152 become zero. Thus, when a tune is being reproduced, the output from the terminal 152 is continuously obtained. However, when a non-signal band or zone is detected the output therefrom is extinguished.

The details of the circuits on and after the time constant circuits 149, 150 and 150a will now be described in conjunction with FIG. 8. Reference numerals 153-1 and 153-2 indicate terminals of a direct current source. Since the output of the terminal 152 (FIG. 7) is supplied to the terminal 154-1 in FIG. 8, transistors 157 and 158 become operative and the exiting coil 139a is supplied with electric power. Numeral 160 indicates a manual switch which is mounted on the front panel of the main body with the group of the push buttons shown in FIG. 2.

When the switch 160 is closed by depressing the push button 114 during the reproduce mode, the cue mode is obtained and the lever 126 rotates in the direction of arrow C causing the actuator 140 to be attracted and latched. Since the lever 126 is also latched the support 11 moves backward by the abutting pin 11a a predetermined distance and is locked there. The exiting coil 139a, at this time, is energized by the audio output as above described with FIG. 7 and FIG. 8.

When the reproduction of the present tune is over and the non-signal zone between the tune and the next one comes, the output from the terminal 152 in FIG. 7 is extinguished, relieving the latching of the actuator 140. The lever 111 and the support 11 will then return to the reproduction position automatically. This has the effect of allowing the listner to listen to the next tune from the beginning or to select another tune. The letter is accomplished by depressing the push button 114 which in effect passes over the next tune to play the following one.

When the actuator 140 is attracted to the portion 139d of the yoke 139, i.e. when the support 11 is backward for the predetermined distance, the changeover switch 146 (FIG. 7) cuts off the output of the speaker 145. This change enables the actuator to obtain the output from the terminal 152. During the reproduction when the actuator 140 is moved leftward the switch is so changed that the whole output is obtained from the speaker 145. The resistor 146a shown in FIG. 7 is to enable a small output to be obtained from the speaker 145. During the selection of a tune, if the push button 114 is further depressed, the fast feed is performed and in this case the selection is stopped. The magnetic head 16, however, disengages the magnetic tape to prevent wear of the magnetic head and increase the fast feed speed.

The foregoing description pertains to the embodiment shown in FIG. 3. In the embodiment shown in FIG. 2 the direct connection of the actuator 136 of the electromagnetic locking apparatus to the lever 111 also enables the tune selection through equivalent action by depression of the push button 114. During the tune selection or the cue mode, reproduce is returned by manually pulling the push button 114. In this case, the lever 111 abuts a step portion 114N of a cut off portion 114M and is rotated counterclockwise, forcing the actuator to return and change over the reproduce. An equivalent means can be used in place of the push button 114 in FIG. 2.

As apparent from FIG. 2, only the addition of a few members (the lever 111 and the electromagnetic apparatus 129, 136) to the mechanism with the well known fast feed is needed to obtain a tune selection apparatus, so that an effective technical means can be provided without changing the ordinary manufacturing process.

When the electric switch 160 is kept opened, since the exiting coil 139a is not supplied with any electric power the depression of the push button 114 causes no locking. Therefore the mode can be changed over to the well known fast feed or cue. In this case, the electric power of about 0.5 watts is enough and the size can be compact, for example about 15×10×30 mm.

Another application of the present invention will be described in conjunction with FIG. 9. The mechanical alternative selection mechanism is well known. Frame 164 is fixed to a deck of the magnetic recording/reproducing apparatus (not shown). A latch lever 171 is slidably held in the direction of arrow H relative to the frame 164 and also is biased in the reverse direction of arrow H. Push buttons 165, 166, 167, etc., are slidable relative to the frame 164 and are mounted in right angular direction against the latch lever 171. Push button rods 165a, 166a, 167a, etc., are connected to the push buttons 165, 166, 167, etc., respectively. Each push button and push button rod is biased in the direction of arrow P by a spring (not shown). When the push button is depressed rightward the push button 166 and the push button rod 166a move rightward and are held at the same position by a latch pin 171b studded on the latch lever 171 and a latch portion 166b of the push button rod 166a. The equivalent action is performed for other push buttons 165, 167, latch pins and latch portions, and by depressing a desired push button rightward the corresponding push button rod is alternatively selected and latched. This type of alternative selection mechanism is well know.

Depressing the push button 166 causes the right end of the push button rod 166a to move and change over the mode to reproduce. That is, the winding reel is driven and takes up the magnetic tape and the electric power is supplied to the capstan motor and to the amplifying circuit from the source. Furthermore the magnetic head and the support carrying the pinch roller move forward to the reproduce position and the reproducing is started. The above described mechanism is indicated generally by numeral 169. Any well known means can be used for these mechanisms.

Depressing the push button 167 causes the push button rod to move rightward and latch and the push button returns. Since a mechanism indicated generally by numeral 170 causes rewinding to start the rewind mode is achieved. Push buttons to perform the mode change-over of other modes, for example, review, cue and record etc., are also mounted, but those have been omitted from FIG. 9.

When all the push buttons 167, 166, 167, etc., return, the electric source is cut off, and the above described support is urged back to the non-reproduce position (the position remote frame a set cassette). In this case the stop mode is achieved. Numeral 129 indicates an electromagnetic apparatus. The electric switch 142 is omitted and the apparatus is constructed that the actuator 136 is locked or relieved. The state known in the FIG. 9 illustrates the apparatus under locking.

When a studded pin 176 studded on the latch lever 171 is movably inserted into a slit 173 provided on the actuator 136, the latch lever 171 and the actuator 136 will slide relative to each other in a predetermined range. A spring 174 is hooked between a studded pin 175 and studded on the actuator 136 and the studded pin 176 and biases the latch lever 171 and the actuator 136 to approach each other. The bias force is set stronger than that of the spring 171a. When the latch lever 171 slides in the reverse direction of arrow H, it slides against the bias force of the spring 174. When the actuator 136 is relieved from locking, the latch lever 171 and the actuator 136 move together in the reverse direction of arrow H. When the push buttons 165, 166, 167, etc., are all relieved from locking and return, as described above, the apparatus is automatically changed over to the stop mode.

A lever 172 is supported by the frame to be able to slide parallel to the latch lever 171 and is biased in the direction of arrow N by a spring (not shown). A protrude 172b of the end of the lever 172 is provided to push an electric switch 172c and close the same. The electric switch 172c, as described later, is a power switch and supplies the electric power only in all cases except the stop mode.

The studded pin 172a of the end portion of the lever is at a postion to abut a protrude 136-1 of the actuator 136. When the push buttons 165, 166, 167, etc., are returned in the stop mode, and one is depressed its corresponding inclined surface portion 165b, 166b, 167b, etc., provided on one of the push button rods 165a, 166a, 167a, etc., will engage a cooperating abutting pin 165c, 166c, 167c, etc., and move the lever 172 in the direction of arrow N. This causes the electric switch 172c to be closed and the actuator 136 to be pushed and moved to lock the apparatus.

As described above, in the present embodiment, when the push buttons 165, 166, and 167 are depressed the corresponding mode is selected, and by cutting off the electric supply to the exiting coil of the electromagnetic apparatus the latch lever 171 springs back and all the push buttons 165, 166, 167, etc., return and the stop mode is automatically achieved.

Now, another embodiment shown in FIGS. 10–16 will be described. A support 41 is rotatably supported by a support shaft 42 on a deck (not shown) and is biased in the direction of arrow A. Long slits 41-1 and 41-2 protruded upward (by press work) are provided on the support 41 and steel balls 43 and 44 are provided between the deck to provide smooth oscillating movement of the support. A magnetic head is mounted on the support 41 and the support 41 contacts with an abutting pin 45 studded on the deck and located at a predetermined reproducing position. A lever 48 is supported by a support shaft 48-1 provided on the deck and is biased in the direction of an arrow B by a spring (not shown).

A pinch roller 47 is mounted on the free end of the lever 48 and is forced against a capstan 49, pinching a magnetic tape (not shown) therebetween. The capstan 49 is supported by a bearing (mounted on the deck), and a fly wheel 410 is fixed at the lower end thereof and driven by a drive belt 411 and a capstan motor (not shown). Reel shafts 416-1 and 417-1 are studded on the bottom of a main body, and a reel 416 (e.g. take up reel) and a reel 417 (e.g. draw out reel) are supported, respectively, and reel supports 414 and 415 are fixed to each reel 416 and 417, respectively. A lever 412 is supported by the support shaft 412-1 provided on the deck, and an idle wheel 413 is supported at the free end of the lever 412. Since the lever 412 is biased in the direction of arrow K by a spring (not shown) a rubber ring around the idle wheel 413 forcedly contacts with both the reel support 414 and a rotating wheel 49a rotatably mounted on the capstan 49.

A protrude 41-3 contacts with an inclined surface 412a provided on the lever 412. When the support 41 rotates clockwise around the support shaft 42 the lever 412 also rotates clockwise and the power transmitted from the wheel 49a to the reel support 414 is cut off. Hubs fixedly inserted into the reels 416 and 417 are omitted and not shown.

The support 41 is shown at the reproduce position with the capstan rotating counterclockwise and the magnetic tape running, the reproducing output being received by the magnetic head 46 and the apparatus being in the reproduce mode. Since the magnetic tape is restricted in its running by the capstan 49 a well known slip mechanism using felt is provided between the wheel 49a, the idle wheel 413, the reel support 414 and the reel 416. A lever 418 and pulley 420 are independently and rotatably supported by a support shaft 418-1 studded on the main body.

A pulley 420 and a rotating wheel 419 are constructed in one body and levers 418 and 418a are connected by a support shaft 418-2. An idle wheel 421 is supported by a support shaft 42-1 provided on the lever 418a. A spring (not shown) is hooked to the levers 418 and 418a, the wheel 419 and a rubber ring around the periphery of the idle wheel 421 are forcedly contacted with each other. A bent portion of the left end of the lever 418a contacts with the free end of the lever 412.

When a push button for the fast feed is depressed, as described later, the support 41 turns clockwise in FIG. 10a by a push button rod. Accordingly, since the lever 412 is rotated clockwise through the protrude 41-3 and the inclined surface 412a, the idle wheel 413 moves leftward and the drive force transmitted from the capstan 49 to the reel 414 is cut off. Since a drive belt is running in the direction of arrows, the levers 418 and 418a are given a counterclockwise torque around the support shaft 418-1 by the friction force due to the forced contact between the idle wheel 421 and the rotating wheel 419.

As described above, when the lever 412 rotates clockwise and the force restricting the left end of the lever 418a is gone the levers 418 and 418a rotate counterclockwise causing the idle wheel 421 to lightly press against the reel 414. Since the press angle is a wedging one the reel 414 is driven counterclockwise by a strong transmitting torque. Since the rotating speed of the reel 414 is of high speed necessary for the fast feed the magnetic tape is taken up and the fast feed mode is achieved. At this time the lever 48 is rotated counterclockwise by an abutting pin 41-4 studded on the support 41, causing the pinch roller 47 to disengage from the capstan 49 and be held there. Of course the magnetic head 46 is also disengaged from the magnetic tape.

In the above described state, when the capstan motor is operated in reverse, the running direction of the drive belt is also reversed. Therefore the idle wheel 421 is in a relief angle and thereby is easily disengaged from the reel stand 414 and the levers 418 and 418a are given a clockwise torque around the support shaft 418-1. Accordingly the idle wheel 421 contacts with the reel stand 415 in a wedging angle and drives it clockwise at high speed to take up the magnetic tape, and thereby enables the rewind mode. As understood from the above description, when the support 41 is at the reproduce position, the reel stand 414 is driven by the idle wheel 413 to enable the rewind mode. When the support 41 backs to come to the non-reproduce position, the reel stand 414 is driven at high speed by the idle wheel 421 to enable the fast feed. When the capstan 49 is operated in reverse at this time the reel stand 415 is driven at high speed to enable the rewind mode.

Although the above described action is performed by the idle wheel 421, the pulley 420 and the rotating wheel 419, a mechanism of the type shown in FIG. 10b may be utilized to achieve the same object. The FIG. 10b mechanism includes levers 423 and 423a which are supported by a support shaft 423-1 studded on a main body to be able to rotate leftward and rightward. Pulleys 427, 424 and 426 are supported on the support shafts 427-1, 425-1 and 426-1, and a drive belt is engaged with the pulleys 427, 424 and 426, as shown in FIG. 10b, which belt is driven by the rotating wheel 49a (see FIG. 10a). A bent portion of the left end of the lever 423a contacts with the free end of the lever 412 (see FIG. 10a). A rotating wheel 425 is constructed in one body with the pulley 424. At the time of the reproduce mode, since the left end of the lever 423a contacts with the lever 412, the idle wheel 425 is at a neutral position remote from both the reel stands 414 and 416. At the time of the fast feed, the levers 423 and 423a rotate counterclockwise in FIG. 10b and the idle wheel drives the reel stand at high speed in a wedging angle. Since when the capstan 49 operates in reverse, the levers 423 and 423a are given a clockwise torque, the idle wheel contacts with the reel stand in a wedging angle and takes up the magnetic tape at high speed and performs in the rewind mode.

The difference between the former embodiment in FIG. 10a and the one in FIG. 10b is that the idle wheel 425 is driven by belt and there is provided an increment of the torque to oscillate the levers 423 and 423a around the support shaft 423-1 by increasing the distance between the pulleys 427 and 426 and the pulley 424.

Figure 11:
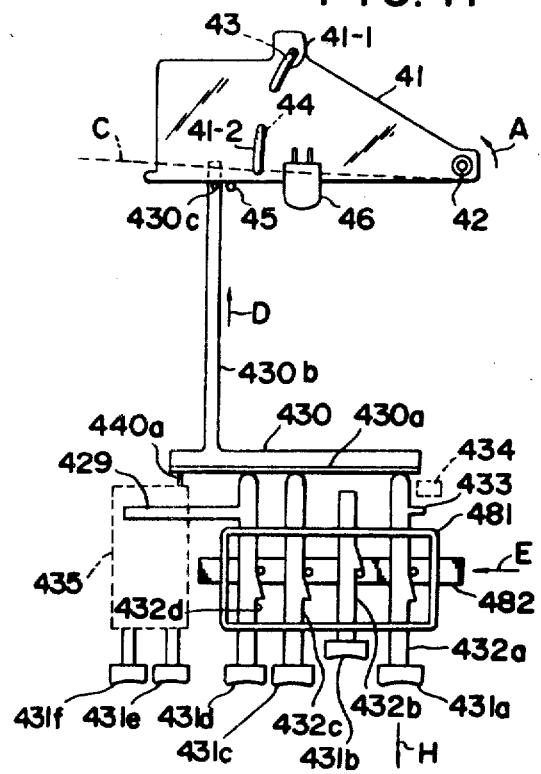
FIG. 11 is a schematic view of the details of the mechanism of FIGS. 10a and 10b.

Referring now to FIG. 11, the details of the above described mode changeover will be described. The support 41 and other items shown in FIG. 10a are indicated by the same numerals. The reels 416 and 417, the capstan 49, the pinch roller 47 and the lever 412 etc. are not shown. Push buttons 431a, 431b, 431c, 431d and push button rods 432a, 432b, 432c and 432d, respectively connected thereto, are movably inserted into a frame 481, and are biased in the direction of arrow H by a spring (not shown). A latch lever 482 is movably inserted into the frame 481 to move leftward and rightward is biased in the direction of arrow E by a spring (not shown). The latch lever 482 provides for the alternative latching of push button rods 432a, —, 432d.

The above described mechanism shows the conventional alternative selecting apparatus. The end portions of the push button rods 432a, 432c and 432d are at the position to contact with the bent portion 430a of a lever 430 and the levers 430 and 430b are supported by the main body to be able to slide in the direction of arrow D or in the reverse. An abutting pin 430c studded on the end portion of the lever 430b contacts with the front edge of the support 41. FIG. 11 illustrates the relative positions of components in the reproduce mode. The pinch roller 47 (see FIG. 10a) runs the magnetic tape in cooperation with the capstan 49, and the magnetic head 46 contacts with the magnetic tape and the reproduce is being performed. When the push button 431a is depressed, the push button 431b returns and the push button 431a and the push button rod 432a are latched and held by the latch lever 482. Since the push button rod 432a pushes the levers 430 and 430b in the direction of arrow D, the support 41 pivots clockwise and causes the non-reproduce position. At the same time the protrude 433 of the push button rods 432a pushes the power switch 434 to cut the power supply to cause the stop mode.

When the push button 431b is depressed, the push button rod 432a returns, supplying the electric power, and the support 41 pivots clockwise and moves forward, causing the reproduce mode.

When the push button 431 is depressed, the push button 431b returns and the push button rod 432c is held in the depressed position. Since the levers 430 and 430b are pushed by the end of the push button rod 432c the support 41 rotates to cause the non-reproduce position. As illustrated in FIG. 10, the reel stand 414 takes up the magnetic tape by the idle wheel 421 to change over to the fast feed mode. When the push button 431d is depressed, the push button rod 432c returns to hold the push button rod 432d in the depressed position. The support 41 is caused to rotate clockwise by the levers 430 and 430b and remains in the reproduce position. At the same time, since the protruding lever 429 contacts with an abutting pin 480a (studded on an actuator 480) shown in FIG. 12 to push the same, the lever 429 actuates a reverse electric switch 437a for the capstan motor. This causes the capstan to rotate in reverse and (as described in connection with FIG. 10a) the idle wheel 421 drives the reel stand 415 at high speed to change over to the rewind mode.

The details of the electromagnetic latching apparatus illustrated by the dotted line 435 in FIG. 11 are shown in FIG. 12 and will now be described. In FIG. 12, a soft steel yoke 439 is fixed in the plastic case 435 on the inside of which is mounted an exiting coil 439a wound in a cylindrical shape. A soft steel cylindrical actuator 440 is movably inserted in a hole provided on the yoke 439. An end 440a of the actuator 440 protrudes outward from the case and is at the position to contact with a bent portion 430a of the lever 430. A left end of another actuator 442 is fixed at another end of the actuator 440. A compression spring 441 is mounted between the actuator 442 and the yoke 439. The actuator 442 is for actuating an electric switch 442a. Electric switches 437a and 442a are slide switches and respective lead out terminals are designated by the numerals 437b and 442b.

An end portion 440b (the portion cut and made narrower) of the actuator 440 is movably inserted in a slit 436-2 provided on the end of a push button rod 436 connected to a push button 431e. A push button rod 436 connected to a push button 431f is slidable relative to and supported by the case 435 and is biased in the direction of arrow G by a spring (not shown). A push button rod 436 is also supported by the case 435 and is biased in the direction of arrow F. A protrude portion 437-1 of the push button rod 437 and a protrude portion 436-1 of the push button rod 436 contact with each other, and when the push button 431f is depressed, a hollow portion 437-2 engages a free end of a plate spring 435a, the base of which fixed to the case 435 to be click stopped. At this time, the bent end portion of the actuator 480 and the push button rod 437 contact with each other, pressing the actuator 480 and causing it to slide in the direction of arrow M against a bias force exerted by a spring (not shown). In this way the electric switch 437a operates and the capstan motor is driven in reverse.

The control means for the electric power supply to the exiting coil 439a is the same as that illustrated in FIG. 7 so no further description is necessary here.

Referring now to FIG. 13, the details of circuits on and after the time constant circuits 449, 450 and 450a (corresponding the time constant circuits 149, 150 and 150a shown in FIG. 7) will be described. Numerals 453-1 and 453-2 indicate the electric source terminal of direct current. The output from the amplifying circuit 148 in FIG. 7 is supplied to terminals 454-1 and 454-2. The output from the time constant circuits 449, 450 and 450a is amplified by transistors 457 and 458 and is energizing an exiting coil 439a. A circuit including a capstan motor 460 will be described later. A circuit including the transistors 457, 458 and an electric switch 456 corresponds to the amplifying circuit 151.

Referring now also to FIG. 11 and FIG. 12, the operation of the apparatus will be described.

When the apparatus is in reproduce mode (when the push button 431b is depressed) and the push button 431e is depressed, the slit portion 436-2 of the push button rod 436 slides along the portion 440b and abuts the left end of the actuator 442. Further depression also presses and moves the actuator 440. At this time, the actuator 442 also moves and causes the electric switch 442a to be operated. Since the changeover switch 146 shown in FIG. 7 is accommodated in the electric switch 442a, the switch 146 is changed. Accordingly the output is obtained from the terminal and the exiting coil 439a is supplied with electric current and the yoke 440 is moved which closes the magnetic circuit sufficiently. Therefore the actuator 440 is strongly attracted and latched.

The end portion 440a of the actuator 440 is made of a non-magnetic material. The exiting electric current for latching the actuator 440 may be very small, for example only 0.1 ampere is required for obtaining the force of 2 kg weight. Since the end portion 440a (as shown in FIG. 11) presses the levers 430 and 430b, they will rotate the support as indicated by the dotted line C. This rotating angle is determined as follows. As the magnetic head 46 contacts under a slight pressure with the magnetic tape to make the running resistance and wear extremely small, the pinch roller is completely disengaged from the capstan.

These conditions are not satisfied, as is well known, for example, if the support 41 is moved back and forth and kept in parallel without any rotation. Since the small backing distance of the magnetic head 46 is required, it is very difficult to mass-produce an item which satisfies the above described conditions.

As in the present embodiment however, when the support shaft 42 is located at the opposite side of that of the pinch roller 47 relative to the magnetic head 46, the preferable conditions described above are easily obtained since the backing distance of the pinch roller 47 (see FIG. 10a) is greater than that of the magnetic head 46. When the push button 431e is depressed, for the reasons described above the actuators 440 and 442, the push button 436 are held in latched position and the output from the magnetic head is energizing the exiting coil 439a. The lever 412 in FIG. 10a escapes leftward through the inclined surface 412a, causing the idle wheel 421 to drive the reel stand 414 to take up the magnetic tape and cause the cue mode. At this time a required small output is obtained from the speaker 145 through the resistance 146a in FIG. 7.

When the magnetic tape runs to bring a non-signal zone before the following tune, the output from the terminal 152 in FIG. 7 is extinguished, stopping the electric power supply to the exiting coil 439a. Therefore the actuators 440, 442 and the push button rod 436 automatically return to change the changeover switch 146 in FIG. 7 to change over to the reproduce mode. At the same time the support 41 moves forward to the reproduce position.

As understood by the above description, when the push button 431e is depressed, the present tune is fed past by the fast feed (cue), and the tune selecting apparatus enables the listener to listen to the following tune from the beginning. When the push button 431f is depressed during the reproduce, the push button rod 437 moves causing the push button rod 436 to move forward at the same time through the protrudes 437-1 and 436-1. Therefore, the actuators 440 and 442 are moved and latched, and the protrude 440a slightly forces the support 41 backward.

At this time the push button 437 is click stopped by the free end of the plate spring 435a engaging the hollow portion 437-1. Also at the same time the bent portion of the actuator 480 is moved by the compression of the push button rod 437 abutting thereto. The actuator 480 changes the electric switch 437a which is a slide switch and reverses the capstan motor. The capstan 49 is also reversed, causing the idle wheel 421 shown in FIG. 10 to contact with the reel stand 415 to rotate it at high speed and perform the rewind (review).

When a non-signal zone before the following tune comes, the input to the exiting coil is cut off, relieving the latching action to the actuators 440 and 442 and returning the actuators. Accordingly, the push button rod 437 is also forced and returned through the protrude 437-1 and 436-1. Since the actuator 480 returns by the bias force in the direction of arrow M by a spring (not shown), the capstan motor returns to the regular drive. The support 41 also returns to change over to the reproduce mode.

As understood by the above description, when the push button 431*f* is depressed the magnetic tape is taken up and the same tune can be listened to from the beginning again i.e. an effect obtained by the present embodiment.

In the above described performance, when the push button 431*f* is depressed, a reverse torque is produced in the capstan motor and the same is reversed, so that a predetermined time is required from when reverse takes place until the reproduce signal is obtained from the magnetic head. If a reproduce signal is not obtained, electric power supply to the exiting coil 439*a* is not initiated, and the push button 431*f* must be depressed and held for a predetermined time in order to select a tune.

It is preferred for eliminating this problem to provide the electric switch 455 and a mono-stable circuit 455*a*. This electric switch 455 is accommodated in the electric switch 437*a* as shown in FIG. 12 and is so constructed that the same is instantaneously closed by the depression of the push button 431*f*. Accordingly, the positive output from the mono-stable circuit holds the transistor 457 operative for a desired time. Therefore electric power is supplied to the exiting coil 439*a* which produces a force to attract and latch the actuator 440 at the same time the push button 431*f* is depressed. This action eliminates the problem discussed above.

For changing over to the so called review and cue mode, the electric switch 456 can be used. When the electric switch 456 is manually kept open, the electric power supply to the exiting coil 439*a* is always cut off. When the push button 431*e* is depressed, the magnetic coil is fast fed. Upon relieving the pressing force the apparatus is automatically returned to the reproduce mode. When the push button 431*f* is depressed, the situation is the same and the cue mode is obtained only during the time the push button 431*f* is depressed. In the above apparatus, the push buttons for cue and review are commonly used with the selecting push button, but they can be provided separately.

A constant running speed of the magnetic tape is desirable in the case of the above described tune selection. If the speed changes the following disadvantages occur. The time constant of the time constant circuits 149, 150, 150*a*, 449, 450 and 450*a* of FIG. 7 and FIG. 13 are determined as follows. When a non-signal zone between tunes occurs the output from the terminal 152 must be terminated. Further, the apparatus is set up not to decrease the output from the terminal 152 by the short time interruption (including the decrease of the output) during the reproduce. Therefore, if the magnetic tape speed changes by a large amount the above described conditions cannot be satisfied and there is a high probability of the failure in the selection.

Generally, when the tape is not restricted by the capstan, the running speed of the magnetic tape has a speed differential between the minimum and the maximum of about three times, depending on the amount of the magnetic tape taken up by the reels 416 and 417, respectively. It is preferred to decrease this difference by providing means for lowering the load characteristic of the capstan motor.

As shown in FIG. 13, the resistor 461 is provided in a direct line with the capstan motor 460 and the electric switch 462 is provided in parallel to the resistor 461. The electric switch 462 is closed at the time of the reproduce mode and is opened only at the time of the fast feed for the tune selection or for rewind. The actuator 442 is connected to the electric switch 442*a* so that it is open when the actuator 442 moves by the compression of the push button 431*e*, achieving the desired object. According to the above means, for example, when the magnetic tape is taken up by the reel 416 which has a large diameter, if the idle wheel 421 contacts with the reel stand 414 in the cue mode, the magnetic tape is fed at high speed, but the load is at its maximum at this time. Therefore the rotating speed of the capstan motor 460 decreases and the running speed of the magnetic tape is decreased, thus the object is achieved.

It is necessary to keep the apparatus for the constant speed control provided for the capstan motor 460 inoperative for the circuit in FIG. 13. For this purpose, the electric switch accommodated in the electric switch 412*a* of FIG. 12 above described is utilized which increases the value of the resistor 461 and operates the motor at lower speed than the rating to keep the governor apparatus inoperative. The reverse switch indicated by numeral 437*a* in FIG. 12 is to be provided for the capstan motor 460, but it is not shown in FIG. 13.

Figure 15:
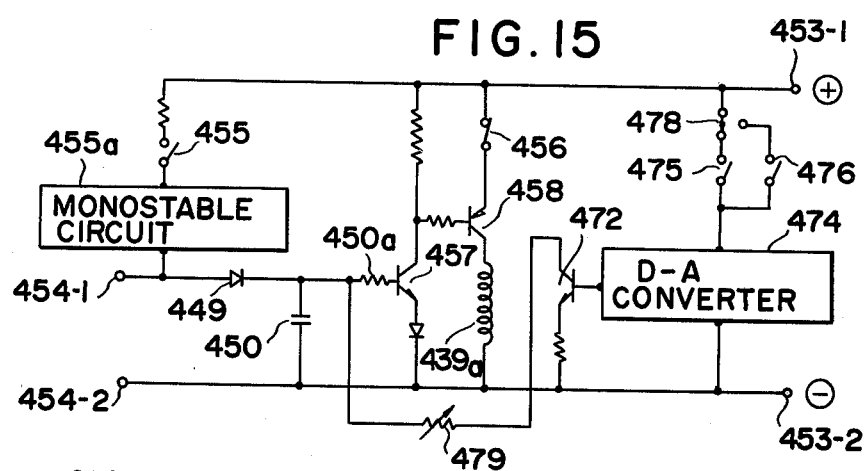
FIG. 15 is a circuit diagram showing circuits of another embodiment of a time constant circuit and of an energizing circuit of the exiting coil.

In the review and cue modes, the magnetic tape is driven at different speeds. FIG. 15 shows means for effecting correct selection of music in these modes by changing the value of time constant of the time-constant circuit including circuit elements 449, 450, 450*a*. In FIG. 15, similar numerals indicate like parts as in FIG. 13 so that a detailed description of these parts is omitted. A changeover switch 478 is included in the switch 437*a* shown in FIG. 12, the changeover operation of the switch 478 only being effected when the push button 431*f* is depressed. An electric switch 478 is provided for the operation described below.

On the backside of the reel stand 417 shown in FIG. 10 are provided commutator means and a slide contact for making contact therewith in a manner such that the slide contact repeatedly comes into and out of contact with the commutator means as the reel stand 417 rotates. Such repeated electric connection/disconnection operation is represented by operation of the switch 475. Any other known means may be alternatively employed for such repeated operation and the frequency of the connection/disconnection may change in proportion to rotating speed of the reel 417. This is the same with an electric switch 476, i.e., frequency of connection/disconnection by the switch 476 may change in proportion to rotating speed of the reel stand 414.

In the cue mode, when quantity of the magnetic tape on the reel 414 is small the running speed of the tape will also be small. At such time, frequency of positive input pulses through the switch 475 is small, and accordingly impedance between the emitter and collection of a transistor 472 will be high. Since the circuit is constructed such that time constant in the circuit 449, 450, 450*a* is controlled also by the transistor 472, overall time constant will be large in the above-mentioned state.

As the amount of the magnetic tape taken up on the reel 416 increases, the running speed of the tape increases. In accordance with this feature, a repetitive number of close/open operations of the switch 475 increases, i.e., frequency of positive input pulses applied to a D-A converting circuit 474 increases. Accordingly, the impedance between the emitter and collector of the transistor 472 will decrease resulting in a decreased value of the time constant.

A variable resistor 479 is adapted to adjust such a decrease in the time constant. As described above, the time constant becomes small as the running speed of the magnetic tape increases, and accordingly control of the exciting coil 439a by means of the output from the terminal 152 shown in FIG. 7 can be performed correctly. That is, as the period of time during which a non-signal zone on the magnetic tape is passing the magnetic head, the value of the time constant of the time constant circuit 449, 450, 450a decreases, and accordingly correct selection of music can be obtained.

Selection of music by the use of the push button 431f shown in FIG. 12 will now be described. When the push button 431f is depressed, the electric switch 437a is operated thorugh an actuator 480, causing the changeover operation of the changeover switch 478 shown in FIG. 15 to be performed. The switch 476 begins to operate through the reel stand 414 and positive pulses are applied to the D-A converting circuit 474. When the quantity of the magnetic tape taken up on the reel 417 is small, the running speed of the magnetic tape is small and the repetitive number of close/open of the switch 476 is small. This repetitive number increases as the quantity of the tape on the reel increases, and running speed of the tape increases. Accordingly, value of time constant of the time constant circuit 449, 450, 450a decreases, and thus correct selection of music can be obtained in a similar manner as in the case of cue mode.

Figure 14:
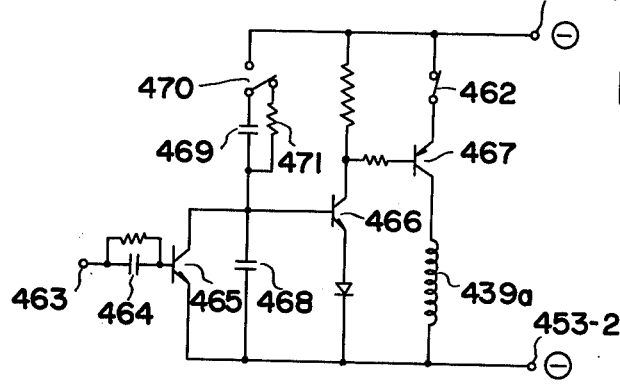
FIG. 14 is a circuit diagram of a memory circuit.

Referring now to FIG. 14, there is shown a circuit to select and reproduce a desired music from its initial point by means of running over a necessary number of musics by fast-feed or rewind. When a positive signal is introduced into a terminal 463, the charging current for a capacitor 464 is supplied to the base of a transistor 465 and a capacitor 468 is discharged by means of the corresponding collector current. Upon changeover operation of an electric switch 470, the capacitor 468 will be charged up to an amount corresponding to charging current for a capacitor 469. When the switch 470 returns back, the capacitor 469 will be discharged through a resistor 471. The amount of charge or voltage on the capacitor 468 will increase in proportion to repetitive number of changeover operations of the switch 470.

With at least one charge of the above-mentioned repetitive charges of capacitor, the base of a transistor 466 is supplied with current resulting in conductive state thereof, and accordingly a transistor 467 becomes conductive, and the exciting coil 439a is supplied with current. The circuit is designed such that the amount of charge to the capacitor 468 through the capacitor 469 is substantially equal to the amount of discharge from the capacitor 468 through the capacitor 464.

The switch 470 is indicated also in FIG. 12 by dotted lines and the same numeral, and the changeover operation thereof can be effected by depressing any one of the push buttons 431f and 431e. At the time one of these push buttons is depressed, a slit portion 436-2 makes sliding reciprocating motion along a portion 440b. The portion 440b has a length which permits a stroke of the push button for effecting a changeover operation of the switch 470.

For selecting a desired tune by fast running over N tunes, for example, a push button 431e is depressed against a light force of a spring in the direction of arrow F. This is done N-1 times to effect N-1 changeover operations of the switch 470 thereby to charge the capacitor 468 shown in FIG. 14 up to an amount corresponding to this N-1 times changeovers of switch 470. The push button 431e is then further depressed strongly to effect further one changeover operation of the switch 470, whereby the capacitor 468 is further charged, the exciting coil 439a is supplied with current, and actuators 440, 442 shown in FIG. 12 are moved to be attractedly latched in position. With this, fast feed in cue mode takes place, and output can be offered from the terminal 152 shown in FIG. 7 according to non-signal zones on the tape which in turn encounter the magnetic head.

When a converting amplifying circuit as shown by dotted line 151a is interposed in the circuit of FIG. 7, output from the terminal 152 will be positive pulse signals which are offered according to the non-signal zones. This output is applied to the terminal 463 shown in FIG. 14, and accordingly, every time a non-signal zone which appears between adjacent tunes is encountered, one discharge of the capacitor 468 takes place. At the completion of N discharges, i.e., at the completion of fast run-over of N musics, the capacitor 468 is completely discharged. Accordingly, the transistors 466 and 467, become non-conductive, current supply to the exciting coil 439a is cut off, and actuators 440 and 442 and a push button rod 436 shown in FIG. 12 are released from their latched engagements to return back to their original positions. Thus, reproduction mode takes place again, and the desired tune can be played from its initial point.

In the reproduction mode, the push button 431f is depressed for selecting a tune by rewinding the tape. With one light depression of the push button 431f, both push button rods 437 and 436 are moved to effect one changeover operation of the changeover switch 470. With N-1, this number of times is stored in the capacitor 468 shown in FIG. 14. Upon one further strong depression of the push button 431f, the number of depressions is stored, and the actuators 440, 442 and the actuator 480 shown in FIG. 12 are depressed at the same time to be attractedly latched by the electromagnetic latching mechanism. Review mode takes place through operation of electric switches 437a, 442a, and the magnetic tape is driven in the reverse direction.

Upon completion of backward running over of N tunes, the capacitor 468 shown in FIG. 14 is completely discharged, and current supply to the exciting coil 439a is cut off. Accordingly, all of the above-mentioned actuators return back to their original positions to effect the reproduction mode, and thus the desired music can be played from its initial point. As will be understood from the above description, tune of a number corresponding to the number of times of depressions of the push buttons 431f, 431a can be run over in a fast feed or rewind fashion, and the following tunes can be selected and played.

The above described mechanism is prefereably designed such that the push buttons 431f and 431e require a small force for depression when they are depressed repeatedly the times corresponding to a desired number of run-over times. On the other hand a large force is required when they are depressed to push the actuators 440, 442, 480.

It is necessary for the mechanism to be designed such that light depression of the push button 431f, which is made in the first state of music selection operation, is in the range where a click stop, which is to be made by a plate spring 435a, does not take place. It is also necessary that, upon elimination of the attracting latch against the actuator 440, the push button rod 437 can return back to its original position through projections 436-1, 437-1 against the force of the click stop, and, at the same time, the actuator 480 can automatically return back to its original position by means of elastic force of a spring acting in the direction of arrow M.

In electric switch 462 shown in FIG. 14 corresponds to an electric switch 456 shown in both FIGS. 13 and 15. When this switch is opened by hand, the exciting coil 439a becomes inoperative, and accordingly music selection operation is stopped and cue or review mode can take place. While in the storing circuit of FIG. 14 the storing function is achieved by charging the capacitor 468, other known means can alternatively be employed. The changeover switch 470 shown in FIG. 14 may be substituted for an ordinary close/open switch, a resistance can be provided for discharge of the capacitor 469, and other means can alternatively be employed.

While in the embodiments of FIG. 10 the mechanisms including idlers 413, 421, 425 are shown as means for driving the reels 416, 417 at the time of tune selection, other known means can alternatively be employed.

Other embodiments will now be described with reference to FIGS. 16 to 19.

Figure 16:
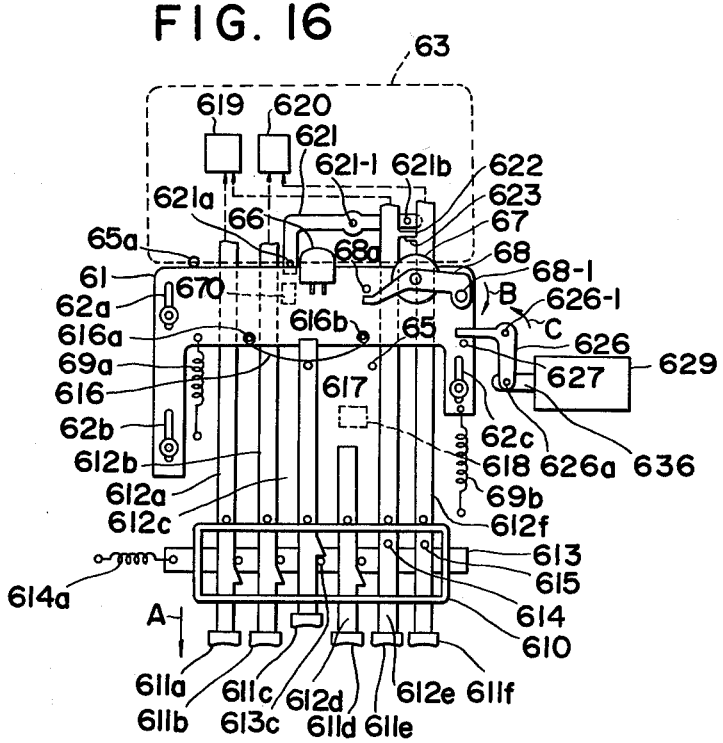
FIG. 16 is a schematic view of another embodiment.

Referring to FIG. 16, a support 61 is carried on a deck (not shown) in a manner that the support can slide forward and backward by means of slits 62a, 62b, 62c and guide pins, and carries thereon a magnetic head 66. The support 61 is elastically biased in a direction by means of springs 69a, 69b, and is restricted to a definite position by means of an arc-shaped wire spring 616 which is adapted to abut against an abutting pin 617 mounted on a push button rod 612c. When the push button rod 612c retires, the support 61 will retire away from a mounted cassette (indicated by dotted line 63) and be stopped at a position by an abutting pin 65 mounted on the deck. At this position, the magnetic head is separated from the magnetic tape, and a pinch roller 67 is separated from a capstan (not shown), that is, this position is a non-reproduction position. A lever 68 is pivoted on a pivoting shaft 68-1 mounted on a support 61, and is elastically biased by a spring (not shown) in the direction of arrow B. The pinch roller 67 is supported for rotation on the free end of the lever 68, and is adapted to pressingly hold the magnetic tape (not shown) between the roller 67 and the capstan.

Push button rods 612a, 612b, . . . , 612f, which are provided respectively with push buttons 611a, 611b, . . . , 611f, and are adapted for commanding mode changeover, are supported by a frame 610 fixed to the main body in a manner that they can slide in the direction parallel to that of arrow A, and are elastically biased in the direction of arrow A by springs (not shown). A latch plate 613 is supported by the frame 610 in a manner that the plate can slide to the right and left, and is elastically biased leftward by a spring 614a. The above-described members are also adapted to constitute a mechanical alternative selection mechanism, wherein, by depressing a desired one of the push buttons, which is associated with the push button rod which can engage a corresponding latch pin, another push button rod which has been latched to a corresponding latch pin, e.g. the push button rod 612c which has been latched to a latch pin 613c mounted on the latch plate 613, is released from the latched engagement. In the illustrated state, the push button 611c (for reproduction mode) is depressed to be latched, and the abutting pin 617 mounted on the push button rod 612c presses against the wire spring 616. The wire spring 616 is made to have a larger elastic force that that of the springs 69a, 99a, and accordingly the support 61 is pushed toward the cassette 63 up to the reproduction position where reproduction can be made. The wire spring 616 has rings formed at its opposite ends which are loosely fitted to support pins 616a, 616b mounted on the support 61. With the support 61 being at this reproduction position, a take-up reel (not shown) is driven through a slip mechanism by a known idler system to take up the magnetic tape.

Then, upon depression of the push button 611d, the push button rod 612d is brought into latched engagement with a corresponding latch pin mounted on the latch plate 613, and depresses, with its top end, an electric switch 618 to cut off power source. At the same time, the push button rod 612c returns back to its original position by means of the mechanical alternative selection mechanism, and accordingly the support 61 is moved backward by means of the springs 69a, 69b. Accordingly, the magnetic head 66 and pinch roller 67 depart away respectively from the magnetic tape and the capstan (not shown).

With the power source being cut off, all operations in the apparatus stop, that is, a stop mode, is effected. Then, upon depression of the push button 611a, the push button rod 612a is brought into latched engagement in a similar manner as that above, the push button rod 612d returns back to its original position, and accordingly power is supplied to the apparatus. A known idler system, which is indicated by the numeral 619, is provided so that the system 619 may be actuated by advancing the push button rod 612a to drive a take-up reel at a high speed, thereby to effect a fast feed mode.

At this time, the support 61 is maintained at its retired position, and accordingly reproduction cannot be made. Then, upon depression of the push button 611b, the push button rod 612a returns back to its original position, and the push button rod 612b, actuates, in a similar manner as with the push button rod 612a, a known idler system 620 which drives a supply reel at a high speed to take up the magnetic tape and a rewind mode is effected. In this mode also, reproduction cannot be made.

Then, upon depression of the push button 611c, the push button rod 612b returns back to its original position, the support 61 advances by means of the abutting pin 617 and the wire spring 616, and thus the reproduction mode is effected. Then, upon depression of the push button 611e associated to the push button rod 612e which has no means for engagement with a latch pin, the push button rod 612e advances and actuates with its top end the idler system 619 which drives the take-up reel at a high speed in a like manner as in the fast feed mode. At this time, the support 61 is retired a little, a mechanism for which will be described below.

On a pivoting shaft 621-1 mounted on the bottom of the main body is pivoted a lever 621. The lever 621 has at its lefthand end portion an abutting pin 621a mounted thereon which is adapted to abut against the forward edge of the support 61. At the righthand end portion of the lever 621 is mounted an abutting pin 621b which is adapted to abut against projections 622 and 623 which are provided respectively to the push button rod 612e and 612f. When the push button rod 612e or 612f is advanced by means of depression of the push button 611e or 611f, the projection 622 or 623 pushes the abutting pin 621, thereby to rotate the lever 621 about the shaft 621-1. Accordingly, the abutting pin 621a pushes the support 61 to make it retire a predetermined distance against the eleastic force of the wire spring 616. This distance of retire is predetermined such that the magnetic head 66 is in contact with the magnetic tape with a small pressure, while the pinch roller 67 retires, through the abutting pin 68a, together with the support 61 to depart away from the capstan. Accordingly, resistance against running of the magnetic tape is small, and the tape can be fast fed or rewound at a free speed of the take-up or the supply reel.

As described above, when the push button 611e is depressed and the abutting pin 614 mounted on the push button rod 612e abuts against the frame 610, the support 61 retires the predetermined distance, and the magnetic tape is fast fed while reproducing output is offered, that is, a cue mode effected. Upon releasing the push button 611 from the hand which has been pushing the push button, the action for the above fast drive is eliminated thereby to effect the reproduction mode again. Then, upon depressing and push button 611f up to a point where an abutting pin 615 comes into abutment with the frame 610, the end of the push button rod 612f activates the idler system 620 to effect rewind of tape, and the support 61 retires the predetermined distance, thereby to effect a review mode. Upon releasing the push button from the hand, the reproduction mode is effected again.

The above is a description about operation in a conventional magnetic recording/reproducing apparatus which has a known mechanism for switching to the review and the cue modes. The instant invention is characterized in that the invention can be reduced in practice with little modification in such conventional mechanism. FIG. 16 illustrates only the component parts incorporated in the invention, others being omitted from the figure. The push button rods 612a, 612b, . . , 612f are mounted on the bottom face of main body, that is, on the back side of the support 61 and the cassette 63. While, in FIG. 16, the push buttons 611a, 611b, . . . , 611f are provided on the rear side of the support 61, these push buttons may be provided on the leading side of the support 61.

A device, which is indicated by the numerals 629, 636, for controlling the support 61 will now be described with reference to FIG. 17. In a housing 629 formed of molded plastic a C-shaped soft steel yoke 639 and another soft steel yoke 639b are fixed. The yokes 639 and 639b mate with each other in a relationship of mutual confrontation with a 90° angular displacement therebetween so that they may form a casing.

An exciting coil 639a is wound around a bobbin 643 which has at its opposite ends collars and has a hollow body portion 643a. The yoke 639b is provided in its central portion with a circular hole 639c through which is inserted a cylindrical soft steel actuator 640. In the illustrated state, there is a magnetic path which is open. When the actuator 640 moves rightward and the right end of the actuator comes into contact with a righthand portion 639d of the yoke 639, the magnetic path is completely closed and the actuator 640 attractedly contacts the yoke 639 with a strong force to be latched thereto.

In an electromagnetic device of this type, a strong attracting force can be obtained as follows: about 800 gr. weight force may be effected under an exciting current of 50 milliamperes at 12 volts. The overall size of such a device may be as small as 15×30×10 millimeters. This is because, in addition to the fact that the magnetic path can be completely closed, a strong attracting force appears between the circular hole 639c and the actuator 640 when the actuator 640 contacts the yoke 639 and the attracting force serves to increase, about twice, the force for latching the actuator 640.

The housing 629 is bolted to the main body through holes 629a, 629b, 629c. A section indicated by the numeral 642 contains therein the changeover switch 146 which has been described in connection with FIG. 7, and is provided with outlet terminals 642b. The switch section 642 has an actuator 636 which is adapted to reciprocate to the right and left for effecting changeover operation of the switch 146. The actuator 636 has at its righthand end a bent portion 636-2 which is an engagement with a depression formed in the left end portion of the actuator 640, so that the actuators 636 and 640 can reciprocate to the right and left in an interlocked relationship. A lever 626 is pivoted on a pivoting shaft 626-1 which in turn is the lever 626 being elastically biased in the direction of arrow C by a spring (not shown). An end portion of the lever 626 is rotatably connected through a connecting pin 626a to the left end portion of the actuator 636, and the left end portion of the lever 626 can abut against an abutting pin 627 (FIG. 16) mounted on the support 61. When the support 61 retires in the review or cue mode, the lever 626 can rotate counterclockwise until the actuator 640 comes into abutment with the portion 639d of the yoke 639, but, in the fast feed or rewind mode wherein the support 61 is going to further retire, the abutting pin 627 disengages from the left end portion of the lever 626 to allow further retirement of the support 61. It is for this reason that the lever 626 is interposed between the actuator 640 and the support 61, although the support 61 could be latched if the support 61 and the actuator 640 were directly interconnected.

When the push button 611e or 611f is depressed while the exciting coil 639a is cut off from the current supply, the ordinary cue or review mode is effected. However, when the push button 611e or 611f is depressed while the exciting coil 639a is supplied with current, the actuator 640 is attracted and latched to the yoke 639, and accordingly the abutting pin 627 abuts against the lever 626 to prevent the associated push button rod from its returning back for locking the push button rod in the review or cue state.

Exciting current required for this locking is small, for example about 50 miliamperes at 12 volts. Accordingly, the source transformer is not required to have a specifically large capacity. By changing the ratio of length between the two arms of the lever 626, which extend from the pivoting shaft 626-1, the exciting electric power may be further reduced. Means for selecting a tune, details of circuits which follow the time-constant circuit, and means for running over a desired number of musics to select the following music are the same as have been described in connection to FIGS. 7, 8 and 14, and accordingly duplicative descriptions of them are omitted here.

In the case of tune selection, a mechanism must be provided for maintaining, by temporarily depressing the push button 611e, the idler system 619 in the same state as the cue, which maintained state of the idler system must be cancelled at the moment when the reproduction takes place again. One embodiment of a means for satisfying such a requirement is shown in FIG. 18 where only the portion which is associated with the push button rod 612e and the idler system 619 is shown.

On a shaft 672-1 mounted to the main body is supported a lever 672 which is elastically biased in the direction of arrow E by a spring (not shown). An abutting pin 672b is mounted to the main body for restricting rotation of the lever 672. The numeral 673 indicates the free end of a bar which is designed, in a known manner, such that the lever 673 can be moved rightward to a position indicated by dotted line 673a so that the idler system 619 is activated to effect the cue mode. When the push button 611e is depressed to move the push button rod 612e rightward, the lever 673 is pushed by the end of the push button rod 612e to be moved rightward.

At this time, the support 61 is retired leftward (in FIG. 18) a predetermined distance by means of the lever 621 shown in FIG. 16. The position of the support 61 depicted in FIG. 18 is such retired position. Upon further depression of the push button 611e, the lever 673 is moved, passing over a slant face 672a formed on the right end portion of the lever 672, to the position of dotted line 673a and is locked there by the righthand end of the lever 672. Thus, the apparatus can be held in the cue mode.

Figure 18:
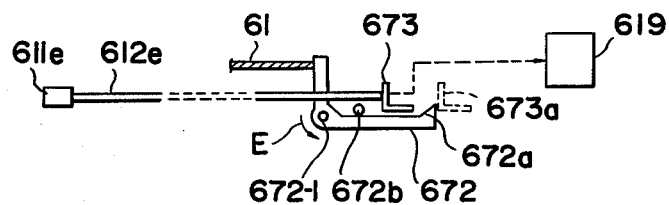
FIG. 18 is a schematic view of a mode holding mechanism for the embodiment of FIG. 16.
Figure 19:
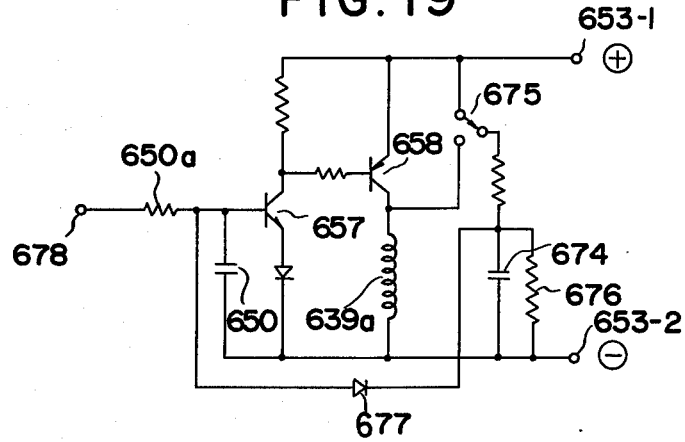
FIG. 19 is a circuit diagram for a portion of an electric circuit for the embodiment of FIG. 16.

At this time, the lever 626 of the electromagnetic device shown in FIG. 16 is locked in position, and the support 61 is held at the position shown in FIG. 18, i.e., at the position of cue mode. Upon completion of the music selection operation, the exciting coil 639a is cut off from current supply, and accordingly the support 61 advances rightward to take up the position of reproduction. Accordingly, the lever 672 rotates clockwise to release the lever 673a from the locking engagement with the lever 672, and thus the lever 673a returns back to the position 673. Accordingly, the idler system 619 regains its original state.

If the exciting coil 639a is not supplied with current, the support 61 returns back to the reproduction position together with the returning back of the push button rod 612e, and accordingly the above-described holding action will not be effected. This corresponds to the cue mode.

For the review mode, similar means are employed. In this case, the lever 672 can be utilized in common, though another special lever may be provided. Requirements as to the review mode are such that the idler system 620 (see FIG. 16) can be actuated, by depressing the push button 611f, to be held in the state of review mode, and can automatically regain its original state at the time when the support 61 returns back to the reproduction position. The electromagnetic device shown in FIG. 17 has the features as described above. Other similar means, however, may alternatively be employed, wherein, upon counterclockwise rotation of the lever 626, a magnetic path is closed to effect locking action, and, upon cutting off the exciting coil 639a from current supply, the lever 626 can return back to its original position, and, at the same time, the magnetic path can be opened.

Figure 17:
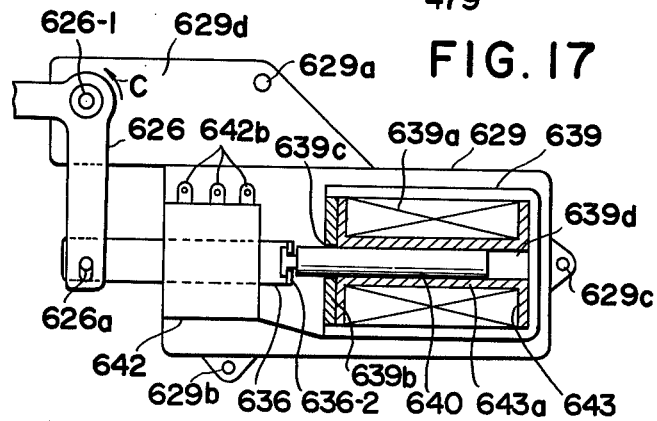
FIG. 17 is a schematic view of an electromagnetic apparatus for the embodiment of FIG. 16.

In the device of FIG. 17, the electric switch section 642 is formed, in connection with the actuator 640, in the same housing, and the pivoting shaft 626-1 for supporting the lever 626 is provided on the extension 629d of the housing 629. Accordingly, the device of FIG. 17 can be constructed as an integral unit including the lever 626 and the electric switch 642, and thus high precision between the component parts can be obtained, and the device can be mass produced. Further, the device can be employed in a conventional mechanism, which has a review/cue mode switching device as shown in FIG. 16, with a small modification of adding to the mechanism the abutting pin 627 and the lever 672 of FIG. 18, thereby to obtain a tune selection apparatus. Instead of the abutting pin 627, a projection may be provided by bending a portion of the support 61 for abutting against the lefthand end portion of the lever 626. Such bent projection can be formed simply by press working. With the electric switch 160 shown in FIG. 8 being open, the exciting coil 639 is not supplied with current, and accordingly locking action cannot take place if the push button 611f or 611e is depressed, and switching to ordinary review or cue mode is allowed.

In the above embodiment, the push buttons 611e, 611f are used for effecting review and cue modes and also for selection of music. If the push buttons 611e, 611f are used exclusively for music selection, provision of the hand-operated switch 160 (FIG. 8) is not required. If the mechanism is designed such that two push buttons for music selection (one for selecting music by fast feed, the other for selecting music by rewind) are provided so that, by depressing each of these switches, the switch 160 (FIG. 8) can be closed, and, at the same time, the idler systems 619, 620 and the lever 621 (FIG. 16) can be activated, provision of the switch 160 on the panel of main body is not required.

In the above embodiments, direction to review/cue mode or music selection mode is distinguished by means of the switch 160. Alternative means wherein the switch 160 is not required will now be described with reference to FIG. 19 which shows a control circuit as an embodiment of such means. To a terminal 678 is applied an output which leads from the section following the diode 149 in the circuit of FIG. 7. Accordingly, the operating manner of transistors 657 and 658 is the same as that of the transistors in the circuit of FIG. 8. That is, the exciting coil 639a is supplied with current during the period when sound output is offered, and the current supply is cut off when a non-signal zone between tunes is encountered. Though not specifically illustrated in FIG. 19, a changeover switch 675 is located at a position equivalent to that of an electric switch 670 in FIG. 16, so that, upon depression of either push button 611e or 611f, the switch 675 can be driven to the left to supply current to the exciting coil 639a. When the push buttons 611e, 611f are not depressed, a capacitor 674 is charged. When the push button 611e or 611f is depressed, the changeover switch 675 is driven to the left, and the support 61 is retired the predetermined distance by means of the lever 621 (FIG. 16), and thus review or cue mode can be effected.

At this time, the exciting coil 639a is supplied with current, but this has no specific influence on the above. When the push button 611e or 611f is released from depression after it has been depressed for a predetermined period of time, the changeover switch 675 is driven to the right. At this time, the capacitor has discharged through a resistor 676. Accordingly, the transistor, with its base voltage being decreased, is in non-conductive state, and accordingly the exciting coil 639a is cut off from the current supply. Accordingly, the lever (FIG. 16) is not locked, and the support 61 advances to the reproduction position to effect reproduction mode. In case the push button 611e, 611f is depressed for a short period of time and then is released from depression, the capacitor 674 is not completely discharged and is at a sufficiently high voltage, and sound output supplied through the terminal 678 is not by-passed through a diode 677. Accordingly, a capacitor 650 is at a sufficiently high voltage to make the transistor 657 conductive, and accordingly the exciting coil 639a is supplied with current. Accordingly, if the changeover switch 675 is driven to the right, the exciting coil 639a is supplied with current by means of sound output to lock the lever (FIG. 16), and thus the support 61 is prohibited from returning to the reproduction position.

When the reproduction of a tune, which is now under play, is completed and the following non-signal zone is encountered, the lever 626 is released from locking, the exciting coil 639a is cut off from current supply, and the support 61 advances to the reproduction position to effect reproduction, thus music selection operation being completed.

As will be understood from the above description, by depressing the push button 611e, 611f for a short period of time, music selection can be performed, and, by depressing the push button 611e, 611f for a period of time exceeding the time period regulated by the capacitor 674 and the resistance 676, review or cue mode can be effected, thus omission of the switch 160 (FIG. 8) being allowed and operation of music selection being eliminated.

While the invention has been described in connection with the preferred embodiments, it is to be understood that various changes and modifications can be made without departing from the spirit and scope of the invention.

We claim:

1. In a magnetic recording/reproducing apparatus for a cassette magnetic tape which includes a non-reproduction mode including que and review operations, the apparatus comprising a deck, a movable plate mounted on the deck, means for moving the plate between reproduction and non-reproduction positions, first spring means for biasing the plate toward the reproduction position, a magnetic head mounted on the movable plate at a position where the magnetic head, when the movable plate is at the reproduction position, is in sliding contact with the magnetic tape, a capstan, a pinch roller mounted on the movable plate, mounting means on the movable plate for mounting the pinch roller for movement between a reproduction position in contact with the capstan and a non-reproduction position out of contact with the capstan, second spring means for biasing the pinch roller to the reproduction position, tape drive means for driving the tape at a play speed when the pinch roller is in its reproduction position and at a fast speed when the pinch roller is in its non-reproduction position, and means for supplying electric current to the tape drive means, the improvement comprising:
manually actuated que and review actuator slides for change-over to the que and review operations, respectively, means for mounting the actuator slides on the deck for reciprocating movement in a direction parallel to the moving direction of the movable plate, third spring means for biasing the actuator slides toward a position in the reproduction mode, the actuator slides being positioned to shift the movable plate to the non-reproduction position when one of the slides has been manually moved to a position in the non-reproduction mode,
a reciprocating magnetic actuator movable in one direction when the movable plate has been moved to the non-reproduction position by one of the actuating slides, the magnetic actuator being operatively connected with said movable plate,
an electromagnetic coil surrounding the magnetic actuator for holding the magnetic actuator in its non-reproduction position by electromagnetic force when supplied with an electric current, means for supplying electric current to the coil upon the movement of the movable plate to the non-reproduction position for causing the movable plate to be held in its non-reproduction position,
means for locking the manually pushed actuator slide together with the held movable plate,
switch means for switching a signal received from the magnetic head to the electromagnetic coil when the actuating slide is moved to its non-reproduction mode position,
circuit means including a time constant circuit interposed between the switch means and the electromagnetic coil for detecting blank zones on the magnetic tape when the switch means has been switched to the electromagnetic coil side,
means responsive to the detection of the blank zones on the magnetic tape for turning off the electric current to said coil, and
means for releasing the actuating slide so that the third spring means will cause the slide to return to the reproduction position when the movable plate has been returned to the reproduction position by the first spring means when the electric current to said coil is turned off.

2. A magnetic recording/reproducing apparatus according to claim 1, wherein the electromagnetic coil comprises a yoke and an exciting coil provided therein, the magnetic actuator being inserted in said coil and through the yoke so that when the plate moves toward the non-reproduction position side against the first spring means, the magnetic actuator will establish a substantially completely closed magnetic circuit through the exciting coil.

3. A magnetic recording/reproducing apparatus according to claim 2, wherein the yoke is a pot-shaped case made of soft steel plates pressed together, the exciting coil being mounted on a coil frame having an elongated circular hole therein, the pot-shaped case being covered with a soft steel lid having a circular hole at its central position, the magnetic actuator being made of soft steel cylinder which is inserted into the elongated hole of the coil frame through the hole of the lid.

4. A magnetic recording/reproducing apparatus according to claim 3, wherein one end of the magnetic actuator is connected to the actuating rod with a predetermined idle space in the direction of movement.

5. A magnetic recording/reproducing apparatus according to claim 4, wherein the magnetic actuator is inserted into the inner face of the hole of the lid with substantially no diametrical clearance therebetween.

6. A magnetic recording/reproducing apparatus according to claim 5, wherein the sliding contact portion between the magnetic actuator and the inner face of the hole of the lid are both roughened.

7. A magnetic recording/reproducing apparatus according to claim 4, wherein said apparatus further includes an electric switch means responsive to the forward and rearward movement of the actuator within an extent of the idle space, a memory circuit for storing the number of switchings of said electric switch means, a first control circuit for energizing the exciting coil of said electromagnetic coil for an interval within which the memory remains and for de-energizing the exciting coil upon erasing the memory, and a second control circuit for erasing the memory of said memory circuit in response to a signal from the time constant circuit.

8. A magnetic recording/reproducing apparatus according to claim 1, further comprising a first mechanism including a slip mechanism connected to the capstan for driving forward the take-up reel of the magnetic tape, a second mechanism for driving the take-up reel of the magnetic tape in high-speed to any one of forward and reversing directions, and a third mechanism for selecting the first mechanism when the plate is in the reproducing position and the second mechanism when the plate is moved slightly from the reproducing position to the non-reproducing position.

9. In a magnetic recording/reproducing apparatus for a cassette magnetic tape which includes a non-reproduction mode including que and review operations, the apparatus comprising a deck, a movable plate mounted on the deck, means for moving the plate between reproduction and non-reproduction positions, first spring means for biasing the plate toward the reproduction position, a magnetic head mounted on the movable plate at a position where the magnetic head, when the movable plate is at the reproduction position, is in sliding contact with the magnetic tape, a capstan, a pinch roller mounted on the movable plate, mounting means on the movable plate for mounting the pinch roller for movement between a reproduction position in contact with the capstan and a non-reproduction position out of contact with the capstan, second spring means for biasing the pinch roller to the reproduction position, tape drive means for driving the tape at a play speed when the pinch roller is in its reproduction position and at a fast que/review speed when the pinch roller is in its non-reproduction position, the cassette magnetic tape at the que and review modes being driven in que and review directions respectively responsive to forward and reverse directions of rotation of the capstan, a reversible motor means for driving the capstan, and means supplying electric current to the tape driving means, the improvement comprising:

manually actuated que and review actuator slides for change-over to the que and review operations, respectively, means for mounting the actuator slides on the deck for reciprocating movement in a direction parallel to the moving direction of the movable plate, third spring means for biasing the actuator slides toward a position in the reproduction mode, a reciprocating magnetic actuator operatively engaged by the actuating slides for reciprocating movement of the magnetic actuator with one of the actuating slides, the magnetic actuator being positioned to manually push the pinch roller away from the capstan when one of the actuating slides has been moved to its non-reproduction mode position, an electromagnetic coil surrounding the magnetic actuator for holding the magnetic actuator in its non-reproduction position by electromagnetic force when supplied with an electric current, means for supplying electric current to the coil upon the movement of the movable plate to the non-reproduction position for causing the movable plate to be held in its non-reproduction position, first switch means for switching a signal received from the magnetic head to the electromagnetic coil when one of the actuating slides has been moved to its non-reproduction mode position, circuit means including a time constant circuit interposed between the first switch means and the electromagnetic coil for detecting blank zones on the magnetic tape when the first switch means has been switched to the electromagnetic coil side, second switch means to be operated by the review actuating slide for reversing the electric current to the reversible motor means for causing the capstan to rotate in reverse when the review actuating slide has been moved to its non-reproduction review mode position, means responsive to the detection of blank zones on the magnetic tape for turning off the electric current to the coil, and means for releasing the actuating slide so that the third spring means will cause the slide to return to the reproduction position when the movable plate has been returned to the reproduction position by the first spring means when the electric current to said coil is turned off.

10. In a magnetic recording/reproducing apparatus for a cassette magnetic tape, which includes a non-reproduction fast-forward que mode, the apparatus comprising a deck, a movable plate mounted on the deck for movement between reproduction and non-reproduction positions, first spring means for biasing the plate toward the reproduction position, a magnetic head mounted on the movable plate at a position where the magnetic head, when the movable plate is at the reproduction position, is in sliding contact with the magnetic tape, a capstan, a pinch roller mounted on the movable plate, mounting means on the movable plate mounting the pinch roller for movement between a reproduction position in contact with the capstan and a non-reproduction position out of contact with the capstan, second spring means for biasing the pinch roller to the reproduction position, tape drive means for driving the tape at a play speed when the pinch roller is in its reproduction position and a fast speed when the pinch roller is in its non-reproduction position, means supplying electric current to the tape drive means, the improvement comprising:

a manually actuated actuator slide for change-over to the fast-forward que mounted on the deck for reciprocating movement in a direction parallel to the moving direction of the movable plate, third spring means for biasing the actuating slide toward a position in a reproduction mode, a reciprocating magnetic actuator operatively engaged by the actuating slide for reciprocating movement of the magnetic actuator being positioned to manually push the pinch roller away from the capstan when the actuating slide has been moved to its non-reproduction mode position, an electromagnetic coil surrounding the said magnetic actuator for holding the magnetic actuator in its non-reproduction position by electromagnetic force when supplied with an electric current, means for supplying electric current to the coil upon the movement of the movable plate to the non-reproduction position for causing the movable plate to be held in its remote non-reproduction position, switch means for switching a signal received from the head to the coil when the actuating slide has been moved to its non-reproduction mode position, circuit means including a time constant circuit interposed between the switch means and electromagnetic coil for detecting blank zones on the magnetic tape when the switch means has been switched to the electromagnetic coil side, means responsive to the detection of blank zones on the magnetic tape for turning off the electric current to the coil, and means for releasing the actuating slide so that the third spring means will cause the slide to return to the reproduction when the movable plate has been returned to the reproduction position by the first spring means when the electric current to said coil is turned off.

* * * * *

UNITED STATES PATENT AND TRADEMARK OFFICE
CERTIFICATE OF CORRECTION

PATENT NO. : 4,129,889  
DATED : December 12, 1978  
INVENTOR(S) : BAN ET AL

It is certified that error appears in the above-identified patent and that said Letters Patent are hereby corrected as shown below:

Column 1, lines 22, 24 and 37, change "york" to --yoke--.

Column 9, line 27, change "167" to --165--;  
line 30, change "frame" to --from--;  
line 41, delete "and" (first occurrence).

Column 10, lines 39 and 66, change "forcedly" to --forcibly--.

Column 11, line 40, change "backs" to --moves back--.

Column 12, line 20, before "is" insert --and--;  
line 27, change "430" (second occurrence) to --430a--.

Column 13, lines 51 and 67, change "exiting" to --exciting--.

Column 14, lines 31 and 41, change "exiting" to --exciting--.

Column 15, lines 22 and 34, change "exiting" to --exciting--.

Column 17, line 24, change "thorugh" to --through--.

Column 21, line 10, change "eleastic" to --elastic--.

Column 25, lines 61 and 62, change "que" to --cue--.

Column 27, lines 24, 41, 43, 49 and 50, change "que" to --cue--.

UNITED STATES PATENT AND TRADEMARK OFFICE
CERTIFICATE OF CORRECTION

PATENT NO. : 4,129,889
DATED : December 12, 1978
INVENTOR(S) : BAN ET AL

It is certified that error appears in the above–identified patent and that said Letters Patent are hereby corrected as shown below:

Column 28, lines 30 and 51, change "que" to --cue--.

IN THE DRAWINGS:

Amend Fig. 11, as per the attached.

Signed and Sealed this

Twelfth Day of June 1979

[SEAL]

Attest:

RUTH C. MASON
Attesting Officer

DONALD W. BANNER
Commissioner of Patents and Trademarks